United States Patent
Futami et al.

(10) Patent No.: US 11,841,445 B2
(45) Date of Patent: Dec. 12, 2023

(54) SATELLITE POSITIONING SIGNAL RECEIVING DEVICE

(71) Applicant: SONY SEMICONDUCTOR SOLUTIONS CORPORATION, Kanagawa (JP)

(72) Inventors: Tetsuhiro Futami, Kanagawa (JP); Katsuyuki Tanaka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 591 days.

(21) Appl. No.: 16/964,912

(22) PCT Filed: Nov. 7, 2018

(86) PCT No.: PCT/JP2018/041272
§ 371 (c)(1),
(2) Date: Jul. 24, 2020

(87) PCT Pub. No.: WO2019/155703
PCT Pub. Date: Aug. 15, 2019

(65) Prior Publication Data
US 2021/0033736 A1 Feb. 4, 2021

(30) Foreign Application Priority Data
Feb. 9, 2018 (JP) .................. 2018-021855

(51) Int. Cl.
*G01S 19/32* (2010.01)
*G01S 19/37* (2010.01)
(52) U.S. Cl.
CPC .............. *G01S 19/32* (2013.01); *G01S 19/37* (2013.01)

(58) Field of Classification Search
CPC .......... G01S 19/32; G01S 19/37; G01S 19/23; H04L 7/033
(Continued)

(56) References Cited

U.S. PATENT DOCUMENTS

2009/0309792 A1 12/2009 Hanabusa
2012/0174445 A1* 7/2012 Jones ...................... G01S 19/53
37/197

(Continued)

FOREIGN PATENT DOCUMENTS

CN 103149579 A 6/2013
DE 102012023315 A1 6/2013
(Continued)

OTHER PUBLICATIONS

International Search Report and Written Opinion of PCT Application No. PCT/JP2018/041272, dated Feb. 12, 2019, 16 pages of ISRWO.

*Primary Examiner* — Vladimir Magloire
*Assistant Examiner* — Alexander L. Syrkin
(74) *Attorney, Agent, or Firm* — CHIP LAW GROUP

(57) ABSTRACT

A satellite positioning signal receiving device that performs positioning using satellite observation information in a plurality of frequency bands enables gradual addition in accordance with a required number of frequency bands. The satellite positioning signal receiving device includes at least one satellite positioning signal receiving circuit that supports a single frequency band, receives a satellite positioning signal, and generates satellite observation information. Each of the satellite positioning signal receiving circuits includes a synchronization control interface that synchronizes the satellite positioning signal receiving circuits with each other, and a satellite information transmission interface that shares the satellite observation information between the satellite positioning signal receiving circuits. The satellite position-
(Continued)

ing signal receiving device performs positioning on the basis of satellite observation information.

18 Claims, 10 Drawing Sheets

(58) Field of Classification Search
USPC .................................................. 342/357.72
See application file for complete search history.

(56) References Cited

U.S. PATENT DOCUMENTS

| | | | |
|---|---|---|---|
| 2013/0141277 A1 | 6/2013 | Hang et al. | |
| 2013/0142295 A1* | 6/2013 | Badke | G01S 19/36 375/350 |
| 2013/0176171 A1* | 7/2013 | Webber | G01S 19/33 342/357.76 |
| 2015/0212211 A1 | 7/2015 | Wietfeldt | |
| 2016/0245923 A1* | 8/2016 | Badke | G01S 19/33 |
| 2017/0212246 A1 | 7/2017 | Houchi et al. | |
| 2017/0279520 A1* | 9/2017 | Kitazawa | H04B 7/18513 |

FOREIGN PATENT DOCUMENTS

| | | | | |
|---|---|---|---|---|
| GB | 2498423 A | | 7/2013 | |
| GB | 2498423 B | * | 2/2015 | ............ G01S 19/33 |
| JP | 64-047982 A | | 2/1989 | |
| JP | 10-054871 A | | 2/1998 | |
| JP | 2004144688 A | * | 5/2004 | ............... G04G 5/00 |
| JP | 2008-051567 A | | 3/2008 | |
| JP | 2009-300274 A | | 12/2009 | |
| JP | 2012-173213 A | | 9/2012 | |
| JP | 2015-184002 A | | 10/2015 | |
| WO | WO-2010068880 A1 | * | 6/2010 | ............ G01S 19/32 |
| WO | 2015/112368 A1 | | 7/2015 | |
| WO | WO-2015112368 A1 | * | 7/2015 | ............ G01S 19/13 |
| WO | 2016/027727 A1 | | 2/2016 | |

* cited by examiner

SATELLITE POSITIONING SIGNAL RECEIVING DEVICE

CROSS REFERENCE TO RELATED APPLICATIONS

This application is a U.S. National Phase of International Patent Application No. PCT/JP2018/041272 filed on Nov. 7, 2018, which claims priority benefit of Japanese Patent Application No. JP 2018-021855 filed in the Japan Patent Office on Feb. 9, 2018. Each of the above-referenced applications is hereby incorporated herein by reference in its entirety.

TECHNICAL FIELD

The present technology relates to a satellite positioning signal receiving device. More specifically, the present technology relates to a satellite positioning signal receiving device that performs positioning using satellite observation information in a plurality of frequency bands.

BACKGROUND ART

Satellite positioning systems represented by the global positioning system (GPS) in the United States have become widespread today in car navigation systems, smartphones, and the like, and position information has become more indispensable in daily life. In addition to the GPS in the United States, QZSS in Japan, GLONASS in Russia, BeiDou in China, Galileo in Europe, and other unique satellite positioning systems have been standardized and operated around the world. Those satellite positioning systems are collectively referred to as global navigation satellite systems (GNSSs).

As for receiving devices that receive satellite positioning signals (GNSS receiving devices or satellite positioning signal receiving devices) in such satellite positioning systems, receiving devices that support only a single frequency band are widely used. In a case of receiving devices that support two or more frequency bands, various advantages can be obtained. For example, a satellite navigation device has been proposed in which navigation signals in two frequency bands are received and a true value of pseudorange is obtained on the basis of each of pseudoranges measured in a plurality of frequencies (for example, see Patent Document 1).

CITATION LIST

Patent Document

Patent Document 1: Japanese Patent Application Laid-Open No. 2008-51567

SUMMARY OF THE INVENTION

Problems to be Solved by the Invention

In the above-described prior art, pseudoranges are measured in a plurality of frequencies to reduce noise components contained in the true value of pseudorange. However, in this prior art, radio frequency circuits (RF circuits) are disposed independently one for every one of a plurality of frequency bands, and satellite capture and tracking circuits supporting the plurality of frequency bands are disposed for a plurality of channels in the same receiving device. Therefore, there is a problem in that the number of RF circuits increases in accordance with the number of frequency bands, and the number of satellite processing units also increases as the number of satellite signals to be received increases. Moreover, satellite capture, satellite tracking, and navigation data decoding also need to support new modernized GNSS signals, which poses a problem in that the circuit size of a satellite processing unit itself significantly increases, and this makes it difficult to support multi-frequency in future.

The present technology has been created in view of such a situation, and is aimed at enabling gradual addition in accordance with a required number of frequency bands in a satellite positioning signal receiving device that performs positioning using satellite observation information in a plurality of frequency bands.

Solutions to Problems

The present technology has been made to solve the above-described problems, and a first aspect of the present technology is a satellite positioning signal receiving device including at least one satellite positioning signal receiving circuit that supports a single frequency band, receives a satellite positioning signal, and generates satellite observation information, in which each of the satellite positioning signal receiving circuits includes a synchronization control interface that synchronizes the satellite positioning signal receiving circuits with each other, and a satellite information transmission interface that shares the satellite observation information between the satellite positioning signal receiving circuits, and positioning is performed on the basis of the satellite observation information. This brings about an effect that the satellite positioning signal receiving circuits are synchronized with each other and satellite observation information is shared.

Furthermore, in the first aspect, the synchronization control interface may include an output signal that is a rectangular pulse signal having a one-second cycle, and an external reset input signal that resets a pulse counter that generates the rectangular pulse signal, and each of the satellite positioning signal receiving circuits may reset the pulse counter on the basis of the external reset input signal, and reset a reference time counter that counts a reference time of the satellite positioning signal receiving circuit on the basis of a count time of the pulse counter. This brings about an effect that the reference time counter is reset on the basis of the count time of the pulse counter.

Furthermore, in the first aspect, the synchronization control interface may include a reset output signal of a reference time counter that counts a reference time of the satellite positioning signal receiving circuit, and an external reset input signal for the reference time counter, and each of the satellite positioning signal receiving circuits may reset the reference time counter on the basis of the external reset input signal, and output the reset output signal on the basis of a count time of the reference time counter. This brings about an effect that the reference time counter is reset on the basis of the external reset input signal.

Furthermore, in the first aspect, each of the satellite positioning signal receiving circuits may reset a reference time counter that counts a reference time of the satellite positioning signal receiving circuit on the basis of a count time of a pulse counter that generates a rectangular pulse signal having a one-second cycle to achieve, in place of the synchronization control interface, synchronization with a time accuracy of the rectangular pulse signal. This brings about an effect that synchronization with the time accuracy of the rectangular pulse signal is achieved without disposing a synchronization control interface.

Furthermore, in the first aspect, the satellite information transmission interface may be a wired interface. Furthermore, in this case, the satellite information transmission interface may be a wired serial interface. Furthermore, the satellite information transmission interface may be a wireless interface.

Furthermore, in the first aspect, among the satellite positioning signal receiving circuits, a satellite positioning signal receiving circuit that receives a frequency band other than a first frequency band may perform satellite capture using satellite observation information obtained from a satellite positioning signal receiving circuit that receives the first frequency band. This brings about an effect that satellite capture is performed using satellite observation information obtained from another satellite positioning signal receiving circuit.

Furthermore, in the first aspect, each of the satellite positioning signal receiving circuits may include an antenna independently of each other. This brings about an effect of achieving a diversity effect and a GNSS compass.

Furthermore, a second aspect of the present technology is a satellite positioning signal receiving device including first and second satellite positioning signal receiving circuits, in which each of the first and second satellite positioning signal receiving circuits includes a radio frequency processing unit that supports a single frequency band and converts a radio frequency signal to a digital signal, a reference time counter that counts a reference time, and a digital signal processing unit that performs satellite capture and satellite tracking on the basis of the digital signal in accordance with the reference time, the reference time counters of the first and second satellite positioning signal receiving circuits count the reference time in synchronization with each other, the second satellite positioning signal receiving circuit acquires satellite observation information in a second frequency band different from the first satellite positioning signal receiving circuit, and supplies the acquired satellite observation information to the first satellite positioning signal receiving circuit, and the first satellite positioning signal receiving circuit acquires satellite observation information in a first frequency band different from the second satellite positioning signal receiving circuit, and performs positioning using satellite observation information in a plurality of frequency bands including the satellite observation information in the second frequency band supplied from the second satellite positioning signal receiving circuit. This brings about an effect that positioning is performed using a plurality of pieces of satellite observation information acquired by the plurality of satellite positioning signal receiving circuits.

Furthermore, in the second aspect, the digital signal processing unit of the second satellite positioning signal receiving circuit may have a circuit configuration supporting only the second frequency band. This brings about an effect of simplifying the second satellite positioning signal receiving circuit.

Furthermore, in the second aspect, each of the first and second satellite positioning signal receiving circuits may further include a pulse counter that outputs a rectangular pulse signal having a one-second cycle to the outside, the pulse counter of the second satellite positioning signal receiving circuit may be reset by the pulse counter of the first satellite positioning signal receiving circuit, and each of the first and second satellite positioning signal receiving circuits may reset the reference time counter in accordance with the pulse counter to cause the reference time counters of the first and second satellite positioning signal receiving circuits to synchronize with each other.

Furthermore, in the second aspect, the reference time counter of the first satellite positioning signal receiving circuit may output a reference time reset signal that resets the reference time, and the reference time counters of the first and second satellite positioning signal receiving circuits may reset the reference time counters in accordance with the reference time reset signal to cause the reference time counters of the first and second satellite positioning signal receiving circuits to synchronize with each other.

Furthermore, in the second aspect, each of the first and second satellite positioning signal receiving circuits may further include a pulse counter that outputs a rectangular pulse signal having a one-second cycle to the outside, the digital signal processing unit of the second satellite positioning signal receiving circuit may perform positioning using satellite observation information in the second frequency band, the pulse counter of the second satellite positioning signal receiving circuit may be corrected on the basis of a result of the positioning using the satellite observation information in the second frequency band, and each of the first and second satellite positioning signal receiving circuits may reset the reference time counter in accordance with the pulse counter to cause the reference time counters of the first and second satellite positioning signal receiving circuits to synchronize with each other.

Furthermore, in the second aspect, each of the first and second satellite positioning signal receiving circuits may include a wireless interface through which satellite observation information in the second frequency band is supplied from the second satellite positioning signal receiving circuit to the first satellite positioning signal receiving circuit. This brings about an effect of reducing the number of wires between the first and second satellite positioning signal receiving circuits.

Furthermore, in the second aspect, the first satellite positioning signal receiving circuit may supply satellite observation information in the first frequency band to the second satellite positioning signal receiving circuit, and the second satellite positioning signal receiving circuit may include a satellite observation value correction unit that corrects the satellite observation information in the first frequency band supplied from the first satellite positioning signal receiving circuit, and perform, on the basis of a result of this correction, satellite tracking in the second frequency band. This brings about an effect of simplifying a circuit required for satellite capture.

Furthermore, in the second aspect, each of the first and second satellite positioning signal receiving circuits may include an antenna through which a radio frequency signal is supplied to the radio frequency processing unit. This brings about an effect that the antennas of the first and second satellite positioning signal receiving circuits are made to be independent of each other to achieve a diversity effect and a GNSS compass.

Furthermore, in the second aspect, a third satellite positioning signal receiving circuit that includes the radio frequency processing unit, the reference time counter, and the digital signal processing unit may be further included, in which the reference time counters of the first and third satellite positioning signal receiving circuits may count the reference time in synchronization with each other, the third satellite positioning signal receiving circuit may acquire satellite observation information in a third frequency band different from the first satellite positioning signal receiving circuit, and supply the acquired satellite observation information to the first satellite positioning signal receiving circuit, and the first satellite positioning signal receiving circuit may perform positioning using satellite observation information in a plurality of frequency bands including the satellite observation information in the third frequency band supplied from the third satellite positioning signal receiving circuit. This brings about an effect of further increasing the satellite observation information acquired at the same time.

Furthermore, a third aspect of the present technology is a satellite positioning signal receiving device including a radio frequency processing unit that supports a single frequency band and converts a radio frequency signal to a digital signal, a digital signal processing unit that performs satellite capture and satellite tracking on the basis of the digital signal in accordance with a reference time, a first phase locked loop that sequentially supplies local oscillator signals in different frequency bands to the radio frequency processing unit, and a second phase locked loop that is independent of the first phase locked loop and supplies a clock signal to an analog-to-digital converter of the radio frequency processing unit and the digital signal processing unit. This brings about an effect that satellite observation information in a plurality of frequency bands is acquired by sequentially switching between frequency bands of radio frequency processing units supporting a single frequency band and digital signal processing units.

Effects of the Invention

The present technology can produce an excellent effect of enabling gradual addition in accordance with a required number of frequency bands in a satellite positioning signal receiving device that performs positioning using satellite observation information in a plurality of frequency bands. This enables optimization of a circuit cost and power consumption for each application. Note that the effects described here are not necessarily restrictive, and the effects of the invention may be any one of the effects described in the present disclosure.

MODE FOR CARRYING OUT THE INVENTION

Modes for carrying out the present technology (hereinafter referred to as "embodiments") will be described below. The description will be made in the following order.

1. First embodiment (example of resetting receiver reference time counter by PPS counter)
2. Second embodiment (example in which slave is dedicated to L1)
3. Third embodiment (example in which receiver reference time counter is directly reset)
4. Fourth embodiment (example in which slave also performs a positioning calculation and corrects PPS counter of slave itself)
5. Fifth embodiment (example of wirelessly transmitting data from slave to master)
6. Sixth embodiment (example in which satellite capture is performed only for L1 and prediction is performed for L2 and L5)
7. Seventh embodiment (example of diversity antenna or GNSS compass)
8. Eighth embodiment (example of supporting three frequencies)
9. Ninth embodiment (example in which slave is omitted)

1. First Embodiment

[Configuration of Satellite Positioning Signal Receiving Device]

Figure 1:
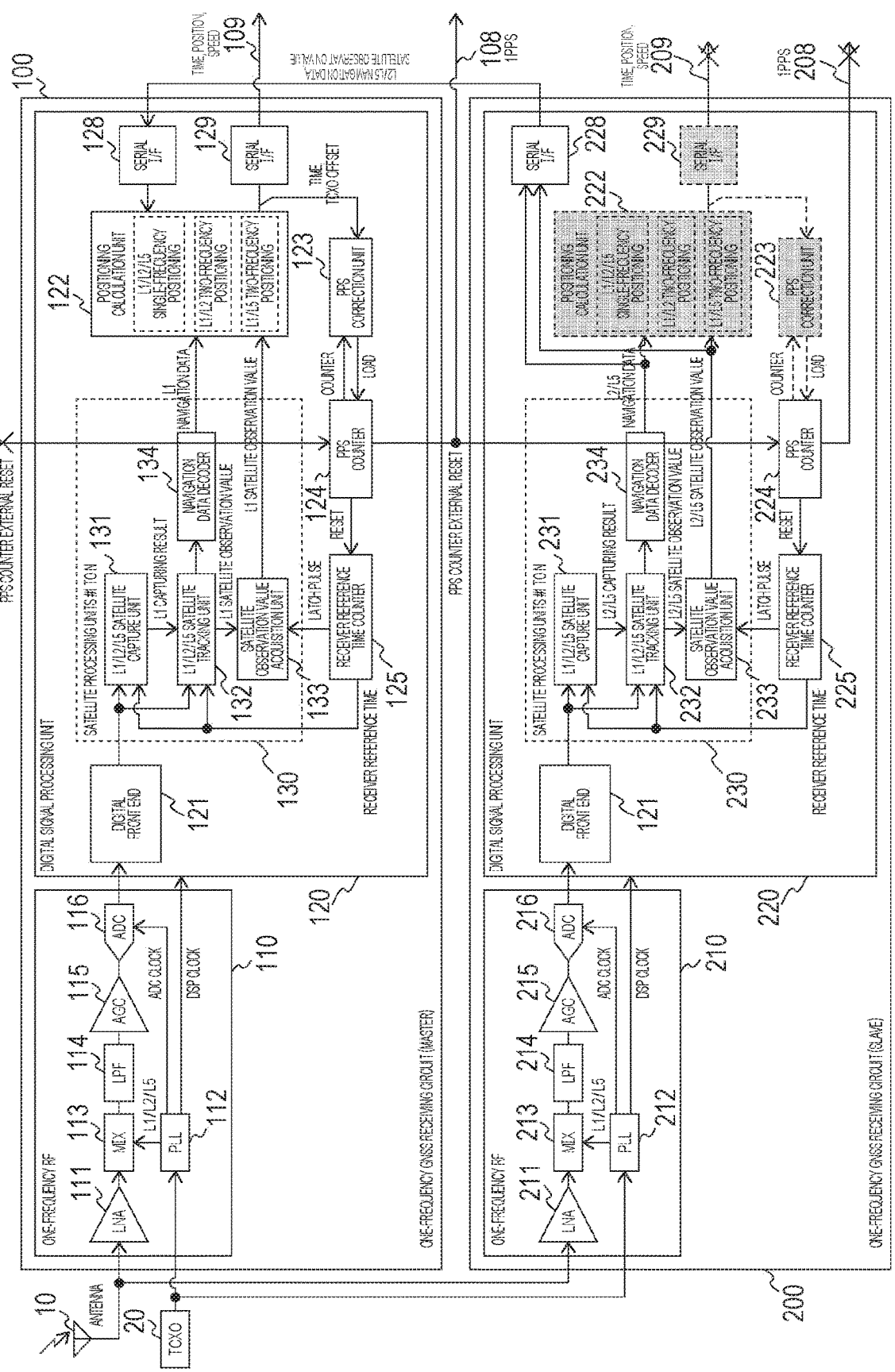
FIG. 1 is a diagram illustrating a configuration example of a satellite positioning signal receiving device according to a first embodiment of the present technology.

FIG. 1 is a diagram illustrating a configuration example of a satellite positioning signal receiving device according to a first embodiment of the present technology.

The satellite positioning signal receiving device is a receiving device that receives a satellite positioning signal in a satellite positioning system (GNSS). In a GNSS, different signal standards are assigned to a plurality of frequency bands. For example, the GPS uses frequency bands such as L1 (1575.42 MHz), L2 (1227.60 MHz), and L5 (1176.45 MHz). The following advantages can be obtained in a case where two or more of these frequency bands are supported.

First, a position accuracy is improved by an ionospheric delay correction. That is, since an ionospheric delay depends on a carrier frequency, observing signals in two or more frequencies enables estimation and correction of the ionospheric delay, thereby reducing a position error caused by the ionosphere.

Second, initialization times in real time kinematic (RTK) and precise point positioning (PPP) are shortened. RTK and PPP are technologies that achieve extremely high-accuracy positioning on the order of several centimeters by using a carrier phase to measure a distance between a satellite and a receiver. They both have a problem of ambiguity caused by indeterminacy of an integer part of the carrier phase. Determining the integer part is called initialization. By using observation values of two or more frequencies, the time required for this initialization can be significantly shortened. Thus, it is generally said that RTK and PPP require two or more frequencies.

Third, an interference resistance is improved. That is, due to an effect of frequency diversity, resistance to interference waves and intentional interference waves generated both inside and outside the device is improved.

Fourth, modernized GNSS signals are used to improve the position accuracy, a multipath resistance, and a sensitivity. L5/E5 frequency band, for which service will be fully operational in the coming years with a corresponding satellite established in the next few years, is also called modernized GNSS, and is expected to improve the position accuracy, the multipath resistance, and the receiving sensitivity by widening a chip rate bandwidth and introducing a pilot channel.

Therefore, in the embodiments of the present technology, it is assumed that positioning is performed using satellite observation information in a plurality of frequency bands. The satellite positioning signal receiving device according to this first embodiment includes two GNSS receiving circuits. One is a GNSS receiving circuit 100 functioning as a master, and the other is a GNSS receiving circuit 200 functioning as a slave. The GNSS receiving circuits 100 and 200 each support different frequencies, only one frequency each, and include an RF circuit 110 or 210 corresponding to one frequency and a digital signal processing unit 120 or 220. The satellite positioning signal receiving device as a whole performs reception for two frequencies, L1 and L2, or two frequencies, L1 and L5. The GNSS receiving circuits 100 and 200 are identical, but are different only in internal operations in accordance with their roles. Consequently, in the following description, an internal configuration of the GNSS receiving circuit 100 will be mainly described, and an internal configuration of the GNSS receiving circuit 200 will also be mentioned as necessary. Note that the GNSS receiving circuits 100 and 200 are examples of a satellite positioning signal receiving circuit described in the claims.

These GNSS receiving circuits 100 and 200 share an antenna 10 and a TCXO 20. The antenna 10 receives a satellite positioning signal. The satellite positioning signal received by the antenna 10 is input to RF circuits of the GNSS receiving circuits 100 and 200 described later. The TCXO 20 is a temperature compensated crystal oscillator. An oscillation signal from the TCXO 20 is supplied to PLLs of the GNSS receiving circuits 100 and 200 described later.

The GNSS receiving circuit 100 includes the RF circuit 110 and the digital signal processing unit 120. The RF circuit 110 receives a radio frequency (RF) signal input from the antenna 10, and supplies the received signal to the digital signal processing unit 120 as a digital signal. The digital signal processing unit 120 performs satellite capture, satellite tracking, and the like on the basis of the digital signal supplied from the RF circuit 110. Note that the RF circuit 110 is an example of a radio frequency processing unit described in the claims.

The RF circuit 110 used supports only one frequency, which is any one of L1, L2, or L5 band. This simplifies a circuit configuration. The RF circuit 110 includes an LNA 111, a PLL 112, a MIX 113, an LPF 114, an AGC 115, and an ADC 116.

The LNA 111 is a low noise amplifier (LNA) that amplifies an RF signal input from the antenna 10. The PLL 112 is a phase locked loop (PLL) that multiplies a reference frequency of the TCXO 20 to generate a local oscillation signal in the L1, L2, or L5 band, an ADC clock, and a DSP clock. The local oscillation signal is supplied to the MIX 113, the ADC clock is supplied to the ADC 116, and the DSP clock is supplied to the digital signal processing unit 120.

The MIX 113 is a mixer circuit that down-converts an amplified RF signal to an IF signal using the local oscillation signal in the L1, L2, or L5 band supplied from the PLL 112.

The LPF 114 is a low pass filter (LPF) that suppresses noise outside a signal band of interest for each IF signal in the L1, L2, or L5 band. The AGC 115 is an auto gain control (AGC) circuit that adjusts an amplitude of an output of the LPF 114.

The ADC 116 is an analog-to-digital converter (A/D converter) that samples an output of the AGC 115 and converts the output from an analog IF signal to a digital IF signal. A sampling clock of the ADC 116 is supplied from the PLL 112 as an ADC clock.

The digital signal processing unit 120 includes a digital front end 121, satellite processing units 130, a positioning calculation unit 122, a PPS correction unit 123, a PPS counter 124, a receiver reference time counter 125, and serial interfaces 128 and 129.

The digital front end 121 performs preceding processing on a digital IF signal in the L1, L2, or L5 band input from the RF circuit 110. That is, the digital front end 121 performs down-conversion to a baseband signal, suppresses noise outside a satellite signal band using a low pass filter, and outputs a baseband signal in the L1, L2, or L5 band.

The satellite processing units 130 are disposed one for each satellite, and perform satellite signal capture, tracking, decoding of navigation data, and acquisition of a satellite observation value on an input baseband signal in any one of the L1, L2, or L5 band. IDs of satellites to be captured are sequentially assigned to the satellite processing units 130, which acquire navigation data and satellite observation values of the corresponding satellites. Prior arts generally require satellite processing units of a number corresponding to a number obtained by multiplying the number of satellites by the number of frequency bands. In this embodiment, the number of satellite processing units can be reduced by limiting the number of frequencies to only one. Each of the satellite processing units 130 includes a satellite capture unit 131, a satellite tracking unit 132, a satellite observation value acquisition unit 133, and a navigation data decoder 134.

The satellite capture unit 131 captures a satellite signal on the basis of correlation detection between an input baseband signal and a satellite-specific code sequence, and outputs a carrier frequency offset and a code phase with a maximum correlation value as a capturing result.

The satellite tracking unit 132 mainly performs correlation processing with a satellite-specific code, code timing synchronization, carrier synchronization, bit synchronization for navigation data, and preamble synchronization, and reproduces a satellite time with an accuracy of a sampling cycle of a baseband signal. A detailed configuration example of the satellite tracking unit 132 will be described later.

The satellite observation value acquisition unit 133 acquires a satellite observation value output from the satellite tracking unit 132. The satellite observation value acquisition unit 133 acquires, simultaneously with the same clock, satellite observation values of all the satellite processing units output from the satellite tracking unit 132 in accordance with a latch pulse supplied from the receiver reference time counter 125.

The navigation data decoder 134 decodes, into navigation data, a demodulated signal output from the satellite tracking unit 132 and synchronized with the satellite time.

The PPS counter 124 counts a one-second cycle synchronized with a GNSS time with an accuracy of a clock cycle. The PPS counter 124 outputs a rectangular pulse signal (1 pulse per second (PPS)) having a one-second cycle to the outside. The 1 PPS output is used in an external communication module or the like for time synchronization. Furthermore, the PPS counter 124 can be reset by an external reset input.

The 1 PPS output of the GNSS receiving circuit 100 is connected to, in addition to an output 108 to the outside, an external reset of a PPS counter 224 of the GNSS receiving circuit 200. Consequently, the PPS counter 224 of the GNSS receiving circuit 200 is reset by a rising edge of a 1 PPS of the GNSS receiving circuit 100. This synchronizes the PPS counters 124 and 224 of the both.

As described above, the GNSS receiving circuits 100 and 200 both generate DSP clocks using the same TCXO 20 as a reference frequency, so that both clocks are synchronized with an accuracy of less than one clock, and their PPS counters 124 and 224 are also synchronized with an accuracy of less than one clock.

The PPS correction unit 123 uses time information and a TCXO frequency offset obtained by the above-described positioning calculation to correct fluctuation of the one-second cycle and phase of the PPS counter 124 caused by the TCXO frequency offset.

The receiver reference time counter 125 counts a reference time of a receiver (GNSS receiving circuit 100). After the digital signal processing unit 120 starts to be supplied with power and a clock, the receiver reference time counter 125 endlessly runs on its own in a cycle of the supplied clock. The receiver reference time counter 125 serves as a reference counter for processing timing and code phase detection in satellite capture and tracking, and is also used for a pseudorange calculation.

Furthermore, the receiver reference time counter 125 also generates a latch pulse that supplies a timing when the satellite observation value acquisition unit 133 acquires a satellite observation value. In order to use satellite observation values for a positioning calculation every second, latch pulses are generated in a fixed cycle of 1 second or less.

Note that the receiver reference time counter 125 is an example of a reference time counter described in the claims.

The receiver reference time counter 125 and a receiver reference time counter 225 of the GNSS receiving circuits 100 and 200, respectively, can be reset only once after the power is turned on at a timing when the corresponding PPS counter 124 or 224 has reached a predetermined count. Since the receiver reference time counters 125 and 225 are free-running counters, once they are reset at the same time, they continue to count up identically thereafter. Consequently, both receiver reference times are synchronized with an accuracy of less than one clock, similarly to the PPS counters 124 and 224.

In this way, by synchronizing both receiver reference times of the GNSS receiving circuits 100 and 200, their timings of acquiring satellite observation values are also synchronized, and satellite observation values in two frequencies at the same time can be thus acquired.

The serial interface 129 outputs a time, position, and speed of the receiver obtained by the positioning calculation to an external host computer, a communication module, or the like. The serial interface 129 includes a general universal asynchronous receiver/transmitter (UART), an inter-integrated circuit (I2C), or the like.

Functions such as the 1 PPS output 108, the positioning calculation unit 122, the PPS correction unit 123, and the serial interface 129 are integrated in the GNSS receiving circuit 100 that is the master. Consequently, a 1 PPS output 208, a positioning calculation unit 222, a PPS correction unit 223, and serial interface 229 of the GNSS receiving circuit 200 that is the slave are invalidated. Shaded blocks and dotted signal lines in the drawings indicate that their functions and signals are invalid and not activated.

This embodiment shows an example of assignment of two frequencies in which the master performs satellite capture and satellite tracking for L1 signals, and the slave performs satellite capture and satellite tracking for L2 or L5 signals. This is only an example, and two-frequency positioning can be achieved similarly even in a case where the assignment is the other way around.

L2 or L5 navigation data and satellite observation value of the GNSS receiving circuit 200 are transferred to the GNSS receiving circuit 100 via a serial interface 228. The GNSS receiving circuit 100 receives the L2 or L5 navigation data and satellite observation value via the serial interface 128, not from the serial interface 129 that outputs positioning results, and inputs them to the positioning calculation unit 122.

The positioning calculation unit 122 performs a positioning calculation by using navigation data and a satellite observation value obtained by the satellite processing unit 130 as inputs, and outputs the time, position, speed, and frequency offset of the TCXO 20 of the receiver (GNSS receiving circuit 100). The positioning calculation unit 122 of the GNSS receiving circuit 100 performs positioning calculations using L1 navigation data and satellite observation value acquired by itself, and the L2 or L5 navigation data and satellite observation value transferred from the GNSS receiving circuit 200. That is, the positioning calculation unit 122 performs a positioning calculation for any one of single-frequency positioning using any one of L1, L2, or L5, two-frequency positioning using L1 and L2, or two-frequency positioning using L1 and L5.

Here, in a case where there is data from three or more satellites, a receiver position (latitude, longitude, and altitude) can be obtained by the principle of trilateration on the basis of satellite positions obtained from navigation data and pseudoranges included in satellite observation values. In practice, an error in time of the receiver is also unknown, so by solving simultaneous equations using data from four or more satellites, it is possible to simultaneously obtain the correct receiver time and receiver position synchronized with the GNSS time.

Similarly, from satellite speeds obtained from navigation data and carrier frequency offsets included in satellite observation values, by solving simultaneous equations using data from four or more satellites, a receiver speed and a frequency offset of the TCXO 20 can be obtained.

[Configuration of Satellite Tracking Unit]

Figure 2:
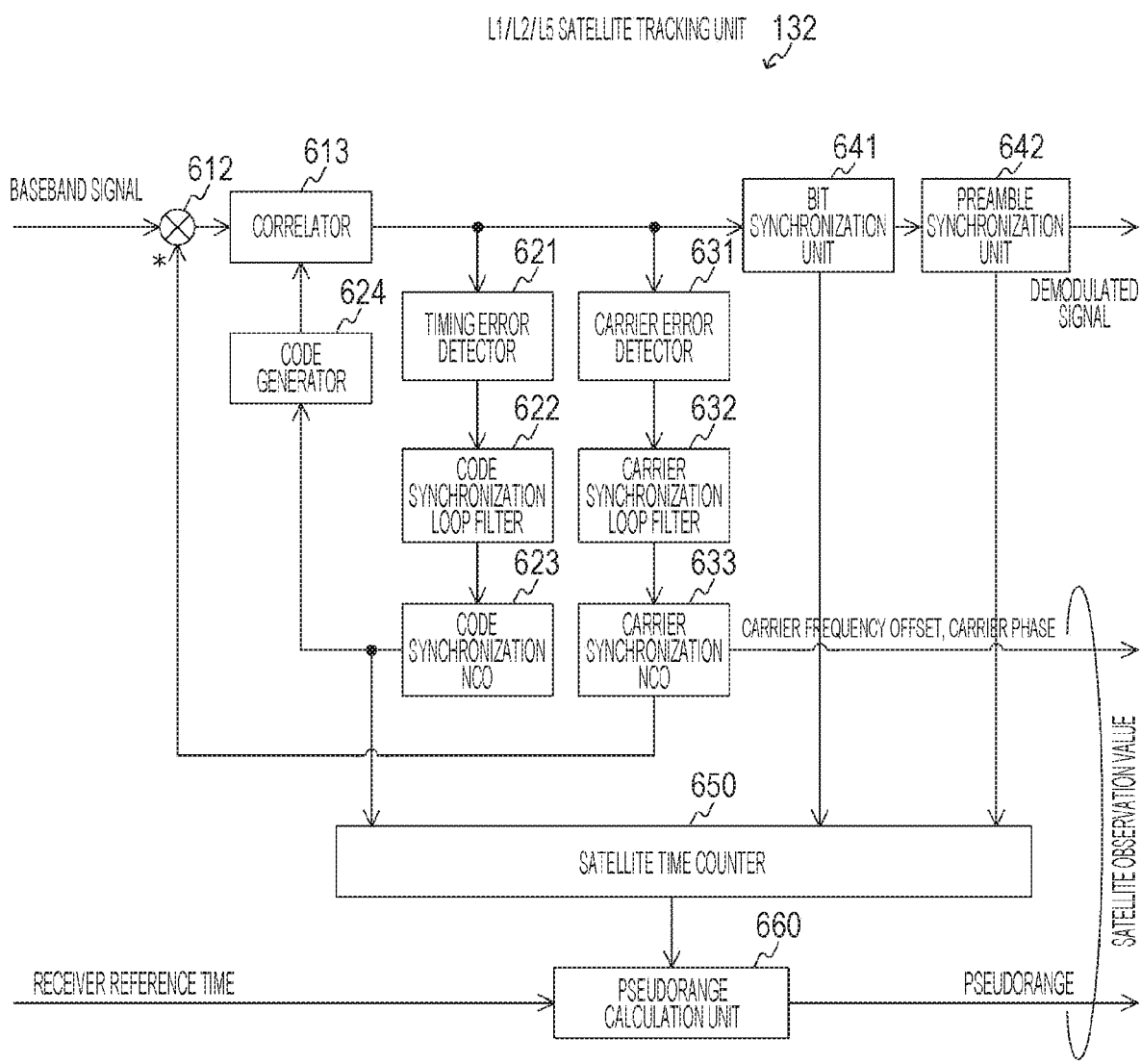
FIG. 2 is a diagram illustrating a configuration example of a satellite tracking unit 132 according to the embodiments of the present technology.

FIG. 2 is a diagram illustrating a configuration example of the satellite tracking unit 132 according to the embodiments of the present technology.

The satellite tracking unit 132 mainly performs correlation processing with a satellite-specific code, code timing synchronization, carrier synchronization, bit synchronization for navigation data, and preamble synchronization, and reproduces a satellite time with an accuracy of a sampling cycle of a baseband signal.

A pseudorange calculation unit 660 estimates a propagation time of a satellite signal by taking a counter difference, in digits equal to or smaller than one second, between a satellite time of a satellite time counter 650 and a receiver reference time of the receiver reference time counter 125. Then, a propagation distance between a satellite and the receiver is estimated by multiplying the estimated propagation time of the satellite signal by the speed of light. The propagation distance estimated here is called a pseudorange because it includes errors due to a TCXO frequency offset and circuit delay of the receiver, and errors due to the ionosphere, the troposphere, multipath, and the like, as compared with an actual geometric distance. These error causes are eliminated as much as possible by the above-described positioning calculation, and the receiver position is calculated.

On the other hand, the demodulated signal synchronized with the satellite time is input to the subsequent navigation data decoder 134, and the navigation data is decoded.

Code timing synchronization is processing for synchronization with a timing (phase) of spread code modulation. This code timing synchronization is implemented by a timing error detector 621, a code synchronization loop filter 622, a code synchronization numerically controlled oscillator (NCO) 623, a code generator 624, and a correlator 613. Here, a feedback loop is formed such that a code timing error converges to zero using a code phase obtained as a result of satellite capture as an initial value, and code timing synchronization is performed.

Furthermore, carrier synchronization is processing for synchronization with a carrier. This carrier synchronization is implemented by a carrier error detector (carrier frequency and phase error detector) 631, a carrier synchronization loop filter 632, a carrier synchronization NCO 633, and a multiplier 612 for a baseband signal. Here, a feedback loop is formed such that a carrier error converges to zero using a carrier frequency offset obtained as a result of satellite capture as an initial value, and carrier synchronization is performed. A frequency offset and phase of the carrier obtained by this carrier synchronization, and the above-described pseudorange are output as satellite observation values.

Bit synchronization is performed by a bit synchronization unit 641. Furthermore, preamble synchronization is performed by a preamble synchronization unit 642.

Effects

In this way, according to the first embodiment of the present technology, it is possible to implement two-frequency positioning by connecting the GNSS receiving circuits 100 and 200 each supporting only one frequency. This enables a flexible design of a satellite positioning signal receiving device. For example, for an application that requires only single-frequency positioning, a receiving device can be configured with only one receiving circuit supporting one frequency. Furthermore, for an application that requires high accuracy by two-frequency positioning, a receiving device can be configured with two receiving circuits each supporting one frequency. This enables more scalable optimization of the circuit cost and power consumption for each application.

2. Second Embodiment

Figure 3:
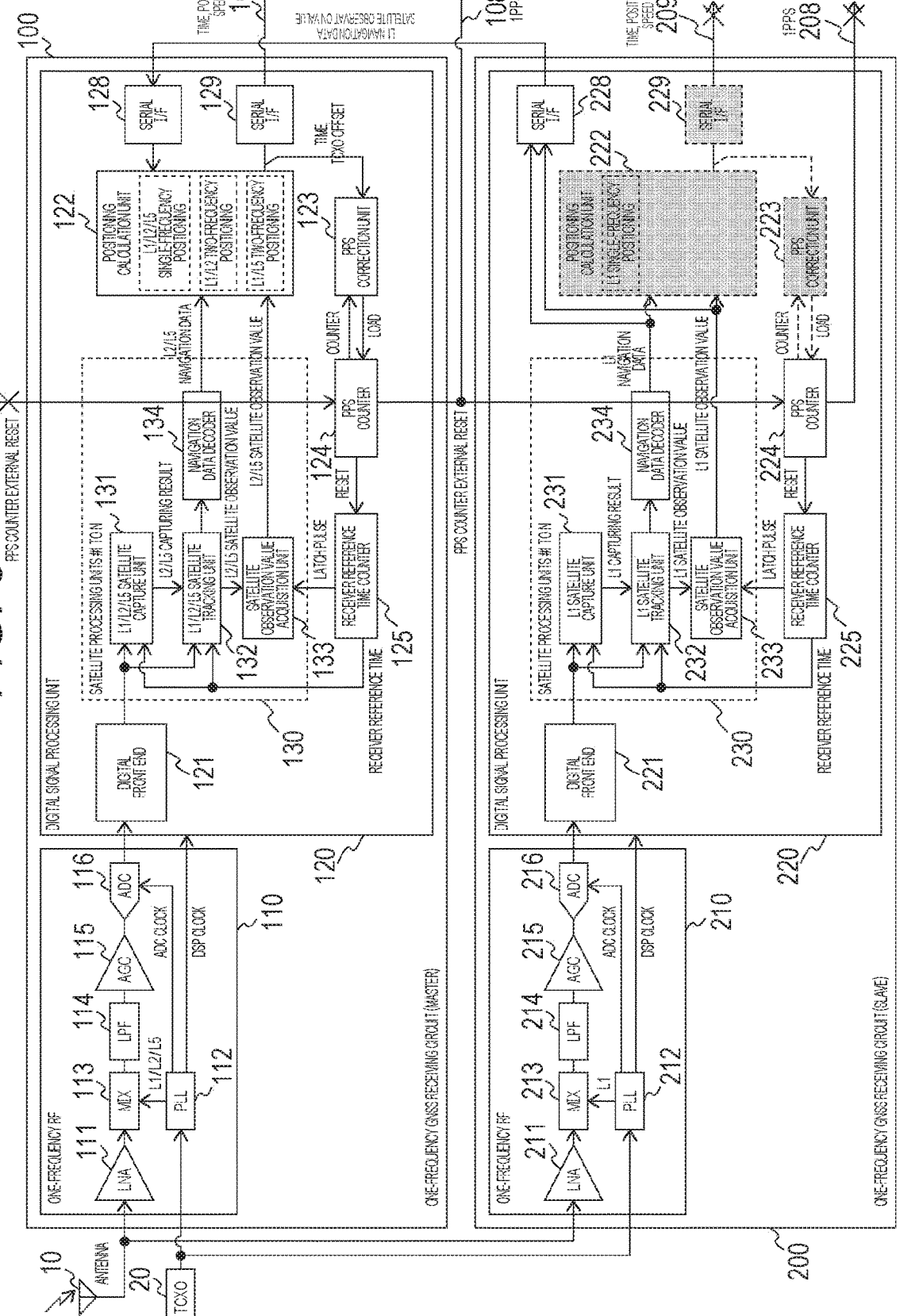
FIG. 3 is a diagram illustrating a configuration example of a satellite positioning signal receiving device according to a second embodiment of the present technology.

FIG. 3 is a diagram illustrating a configuration example of a satellite positioning signal receiving device according to a second embodiment of the present technology.

The second embodiment differs from the above-described first embodiment only in that a GNSS receiving circuit 200, which is a slave, supports only one frequency, L1. That is, a satellite capture unit 231 and a satellite tracking unit 232 support only one frequency, L1, and L1 navigation data and satellite observation values are transferred from the GNSS receiving circuit 200 to a GNSS receiving circuit 100.

In this way, according to the second embodiment of the present technology, the GNSS receiving circuit 200 supports only one frequency, L1, so that the circuit cost and power consumption of the entire satellite positioning signal receiving device can be further reduced as compared with the above-described first embodiment. At this time, as compared with the above-described first embodiment, the number of types of GNSS receiving circuits increases, but it is possible to increase the number of options for applications that require single-frequency positioning only for L1, such applications being currently most widely used. Therefore, the circuit cost for each application and scalability of power consumption can be further improved.

3. Third Embodiment

Figure 4:
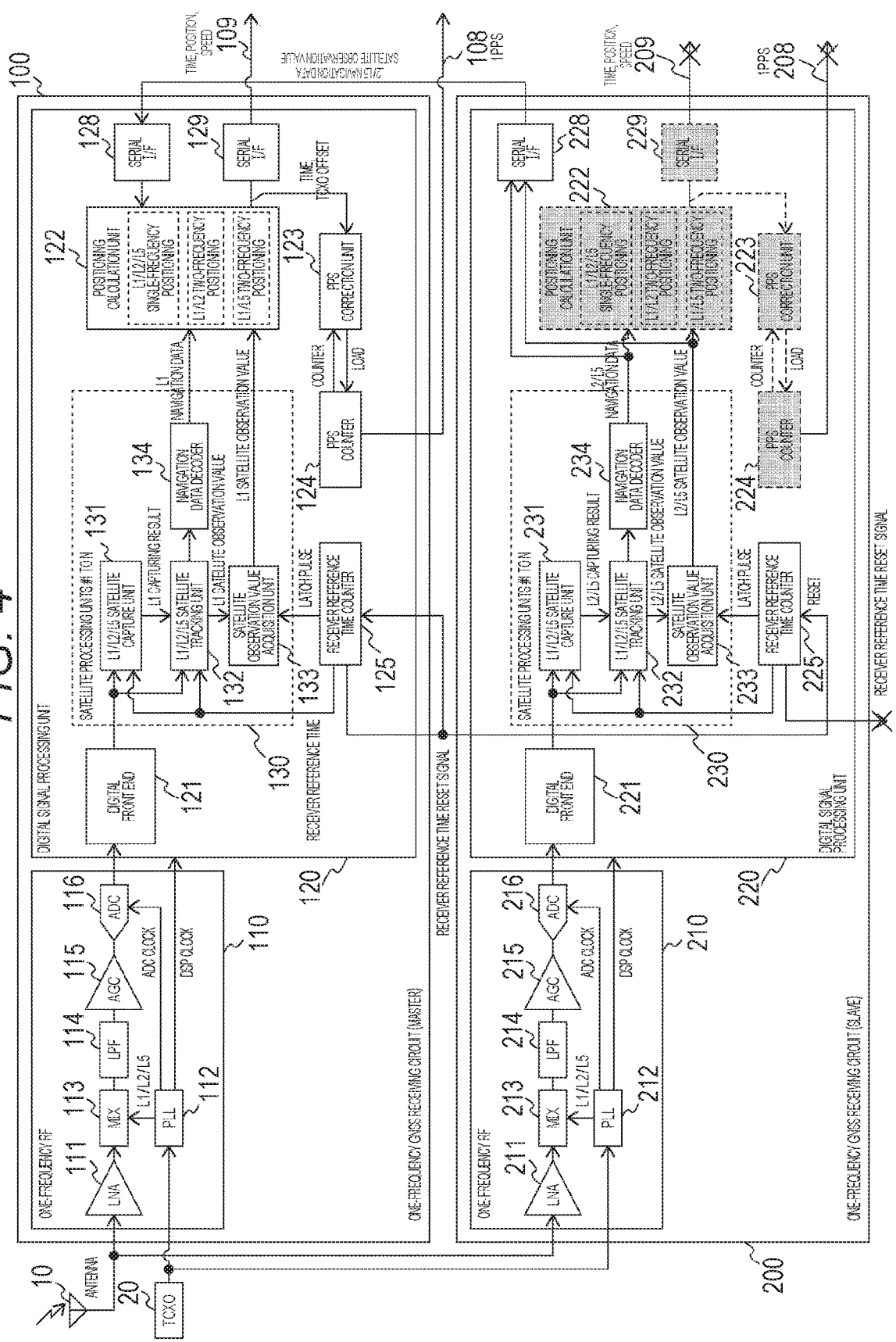
FIG. 4 is a diagram illustrating a configuration example of a satellite positioning signal receiving device according to a third embodiment of the present technology.

FIG. 4 is a diagram illustrating a configuration example of a satellite positioning signal receiving device according to a third embodiment of the present technology.

The third embodiment differs from the above-described first embodiment only in that receiver reference time counters 125 and 225 can be directly synchronized without using a PPS counter 124 or 224.

An external reset of the PPS counter 124 or 224 and a reset from the PPS counter 124 or 224 to the receiver reference time counter 125 or 225 are omitted. Instead, an external reset input to the receiver reference time counters 125 and 225 and a reset output are added. That is, the receiver reference time counters 125 and 225 are additionally provided with a function of outputting a reset signal only once at a predetermined count timing and a function of resetting their own counters, which is triggered by an external reset input.

The reset signal output from the receiver reference time counter 125 is input to an external reset of the receiver reference time counter 225. Furthermore, the receiver reference time counter 125 loops back the reset signal to its own external reset signal. This allows the receiver reference time counters 125 and 225 to be reset at the same time, and their receiver reference times to be synchronized.

The third embodiment is another form of the method of synchronizing both receiver times of GNSS receiving circuits 100 and 200, and other functions and effects to be achieved are similar to those of the above-described first embodiment.

4. Fourth Embodiment

Figure 5:
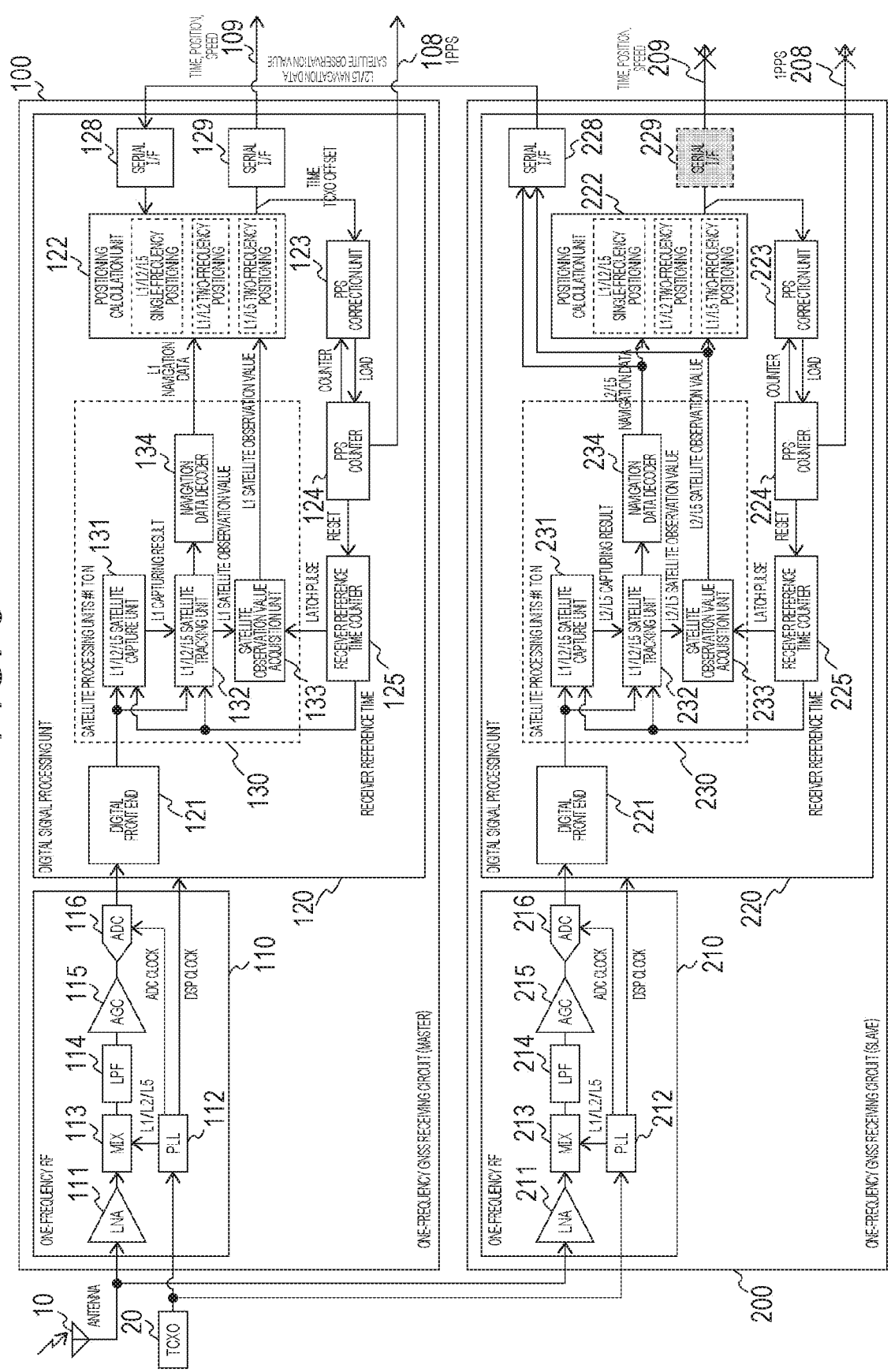
FIG. 5 is a diagram illustrating a configuration example of a satellite positioning signal receiving device according to a fourth embodiment of the present technology.

FIG. 5 is a diagram illustrating a configuration example of a satellite positioning signal receiving device according to a fourth embodiment of the present technology.

The fourth embodiment differs from the above-described first embodiment in that a mechanism for synchronizing master/slave PPS counters, the synchronization being triggered by a 1 PPS of a GNSS receiving circuit 100, is omitted. Instead, a GNSS receiving circuit 200 also performs an L2 or L5 positioning calculation and corrects a PPS counter 224 of the GNSS receiving circuit 200 itself. Thus, the GNSS receiving circuits 100 and 200 synchronize receiver reference times on the basis of their PPS counters 124 and 224, respectively.

In this case, synchronization of the receiver reference times and two-frequency positioning need to wait until both the GNSS receiving circuits 100 and 200 complete positioning calculations and a time accuracy of the 1 PPS is sufficiently stabilized. On the other hand, external reset terminals of the PPS counters 124 and 224 and a 1 PPS wire between the GNSS receiving circuits 100 and 200 can be eliminated. That is, there is an advantage that it is not necessary to dispose an extra interface from the viewpoint of layout.

5. Fifth Embodiment

Figure 6:
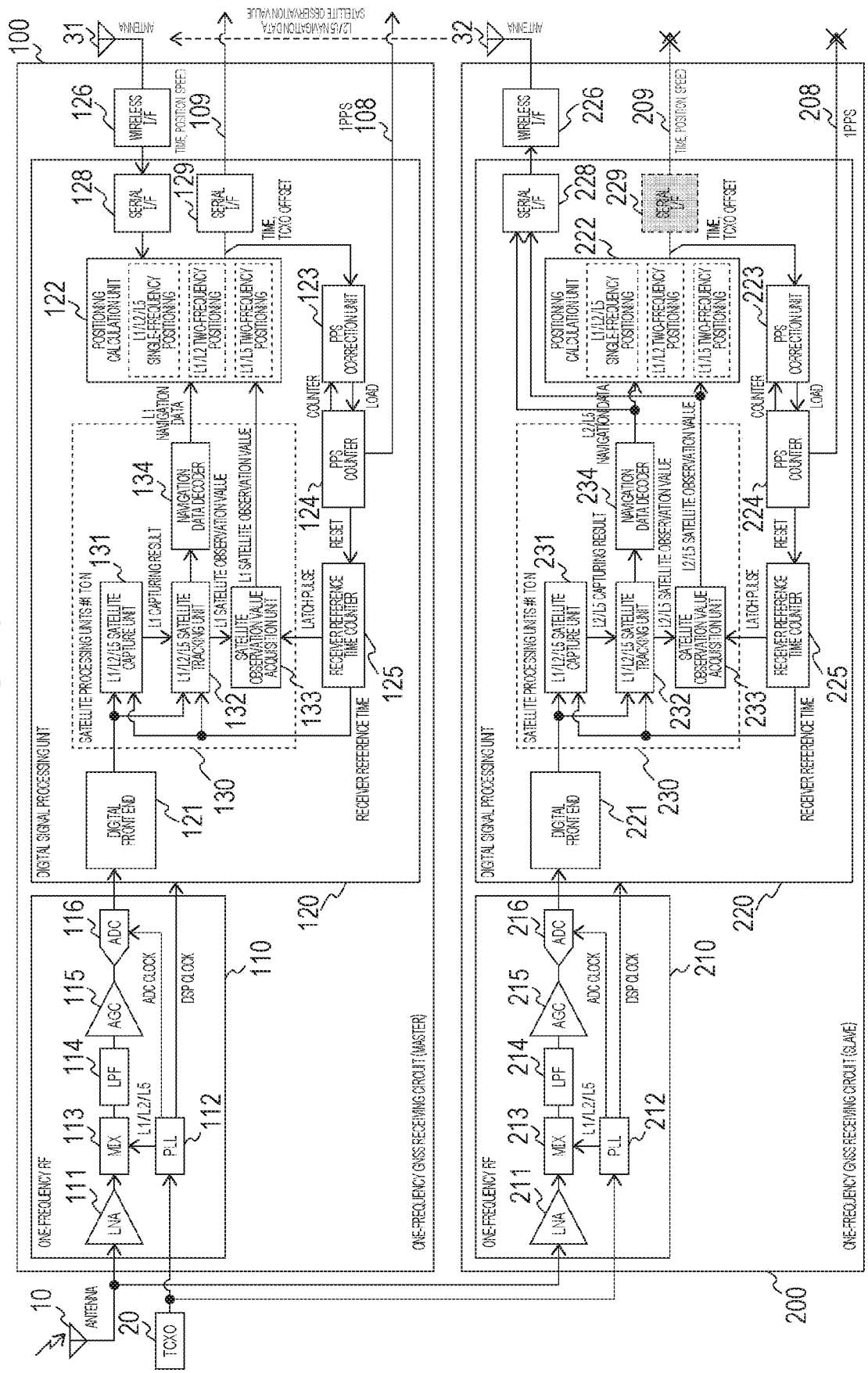
FIG. 6 is a diagram illustrating a configuration example of a satellite positioning signal receiving device according to a fifth embodiment of the present technology.

FIG. 6 is a diagram illustrating a configuration example of a satellite positioning signal receiving device according to a fifth embodiment of the present technology.

The fifth embodiment differs from the above-described fourth embodiment in that data is transmitted from a GNSS receiving circuit 200 to a GNSS receiving circuit 100 not by wire but wirelessly. Thus, in the fifth embodiment, a wireless interface 126 or 226 and a wireless transmission antenna 31 or 32 are added subsequent to a serial interface 128 or 228.

The fifth embodiment uses wireless communication to further reduce the number of master/slave wires, thereby increasing flexibility in layout of the GNSS receiving circuits 100 and 200.

6. Sixth Embodiment

Figure 7:
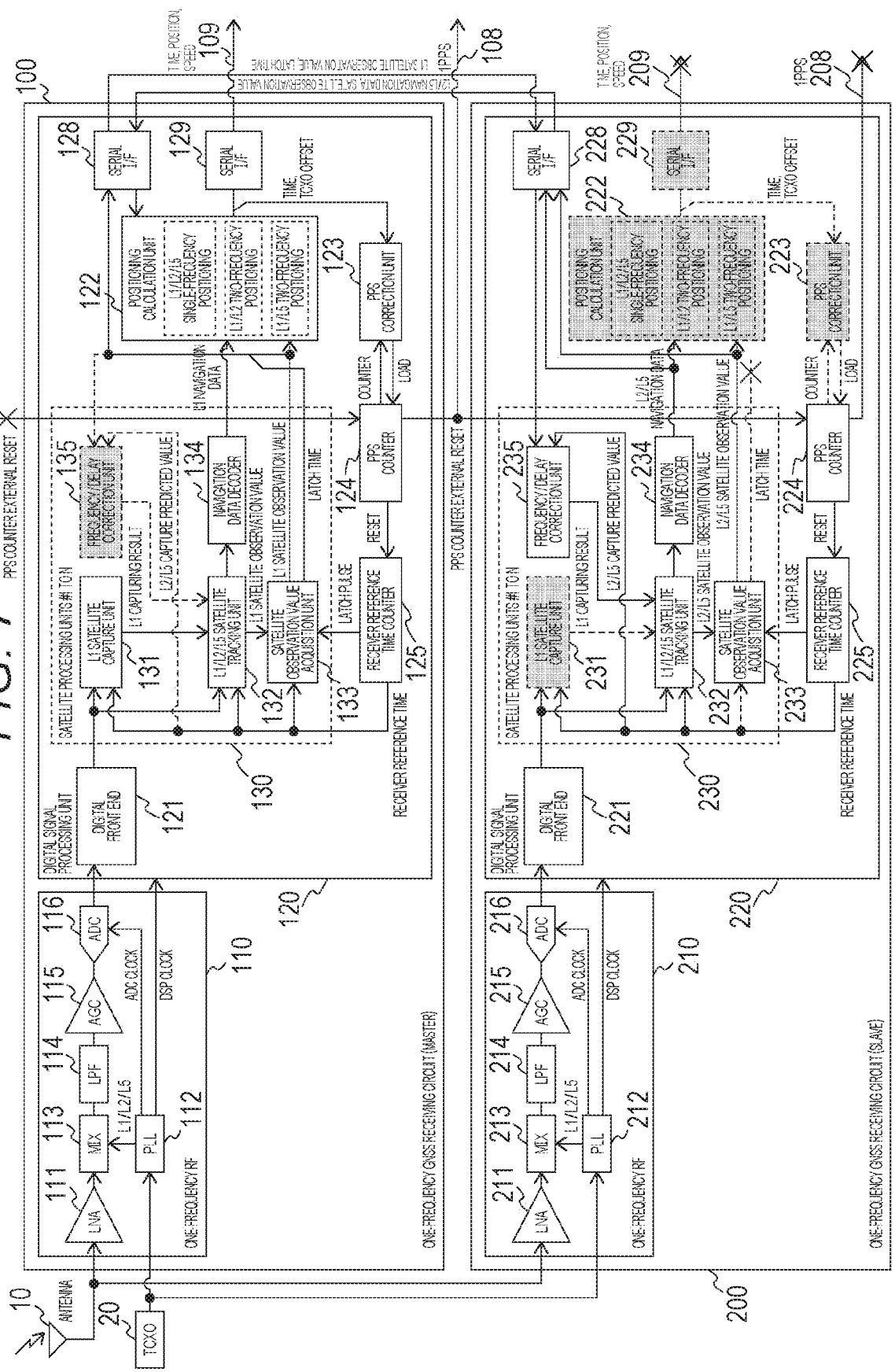
FIG. 7 is a diagram illustrating a configuration example of a satellite positioning signal receiving device according to a sixth embodiment of the present technology.

FIG. 7 is a diagram illustrating a configuration example of a satellite positioning signal receiving device according to a sixth embodiment of the present technology.

The sixth embodiment differs from the above-described first embodiment in the following points. First, in a satellite processing unit 130, a satellite capture unit 131 supports only L1. Furthermore, in a satellite processing unit 230, a frequency/delay correction unit 235 is added. Furthermore, the satellite processing unit 130 also holds a receiver reference time (latch time) at which a satellite observation value acquisition unit 133 has acquired a satellite observation value. Furthermore, an L1 satellite observation value and latch time acquired by a GNSS receiving circuit 100 are transferred to a GNSS receiving circuit 200 via serial interfaces 128 and 228.

A method is known in which L2 and L5 satellite capture is performed using L1 satellite tracking results by utilizing the fact that L2 and L5 transmission frames are synchronized with an L1 transmission frame. Using such a method eliminates the need for supporting satellite capture for L2 or L5 alone, L2 having a code sequence length 10 times that of L1, and L5 having a code sequence length and code band 10 times those of L1. It is therefore possible to avoid an increase in the circuit size and power consumption for L2 or L5 satellite capture. The sixth embodiment is an example of enabling L2 or L5 satellite capture using such an L1 assist.

The L1 satellite observation value and latch time acquired by the GNSS receiving circuit 100 are input to the frequency/delay correction unit 235 of the GNSS receiving circuit 200, and the satellite observation value is corrected taking into consideration a difference in carrier frequency between L1 and L2 or L5 and a time elapsed since a latch time. Since L2 or L5 satellite capture information (carrier frequency offset and code phase) can be predicted from the corrected satellite observation value, L2 or L5 satellite tracking can be performed using this predicted value.

Specifically, the satellite observation value is corrected by the following procedure, and L2 or L5 satellite capture information is predicted. First, in a case where the time elapsed since the latch time is sufficiently small and the change in Doppler frequency within the elapsed time can be ignored, assuming that the L1 carrier frequency is $f_{L1}$, the L2 or L5 carrier frequency is $f_{Lx}$, and the L1 carrier frequency offset included in the satellite observation value is $\Delta f_{L1}$, a predicted value $\Delta f_{Lx}$ of the L2 or L5 carrier frequency offset is calculated as shown in the following equation.

$$\Delta f_{Lx} = \Delta f_{L1} \times f_{Lx}/f_{L1}$$

On the other hand, in a case where the change in Doppler frequency within the elapsed time cannot be ignored, a change rate $Rf_{L1}$ of the carrier frequency offset is obtained from satellite observation values of a plurality of consecutive samples. Then, assuming that an elapsed time from the latch time to a receiver reference time at which satellite tracking starts is $\Delta t$, $\Delta f_{Lx}$ is calculated by the following equation.

$$\Delta f_{Lx} = (\Delta f_{L1} + Rf_{L1} \cdot \Delta t) \times f_{Lx}/f_{L1}$$

Furthermore, by restoring a satellite time at the time of latching from a pseudorange included in the satellite observation value, an L1 bit boundary and a subframe boundary are obtained. Then, by advancing the phase of the L2 or L5 transmission frame synchronized with this by the elapsed time, a predicted value of the L2 or L5 code phase can be obtained.

In this way, according to the sixth embodiment of the present technology, since L2 or L5 satellite tracking can be performed using an L1 satellite observation value, it is possible to avoid an increase in the circuit size for satellite capture caused by supporting capture for L2 or L5 alone, and it is possible to further reduce the circuit cost.

7. Seventh Embodiment

Figure 8:
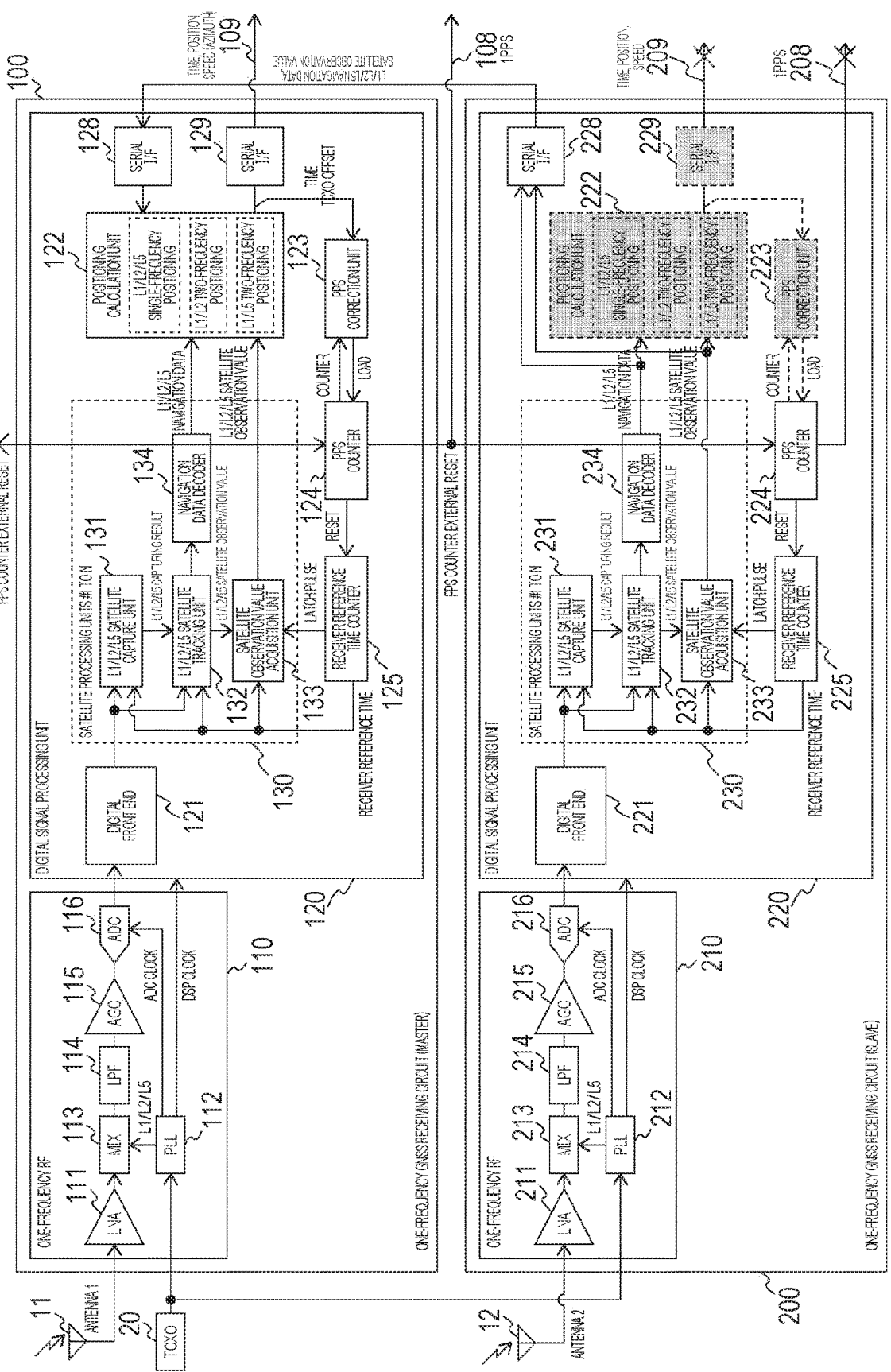
FIG. 8 is a diagram illustrating a configuration example of a satellite positioning signal receiving device according to a seventh embodiment of the present technology.

FIG. 8 is a diagram illustrating a configuration example of a satellite positioning signal receiving device according to a seventh embodiment of the present technology.

The seventh embodiment differs from the above-described first embodiment in that an antenna 11 of a GNSS receiving circuit 100 and an antenna 12 of a GNSS receiving circuit 200 are separately disposed.

By arranging the antennas 11 and 12 apart from each other by one wavelength or more of a carrier, a spatial correlation is eliminated, and a diversity effect can be obtained. That is, the GNSS receiving circuits 100 and 200 capture and track, from the different antennas 11 and 12, satellite signals of the same frequency band, which is any one of L1, L2, or L5, and select a satellite observation value from the two, whichever has better demodulation quality, and the selected satellite observation value is used for a positioning calculation. This enables implementation of more stable single-frequency positioning performance.

Furthermore, by arranging the two antennas 11 and 12 apart from each other by a certain distance to form a baseline vector, the antennas 11 and 12 can be applied as a GNSS compass using a single frequency, which is any one of L1, L2, or L5. The GNSS compass is a carrier positioning technology that applies the principle of RTK, and can be used to obtain the azimuth of the baseline vector with high accuracy.

8. Eighth Embodiment

Figure 9:
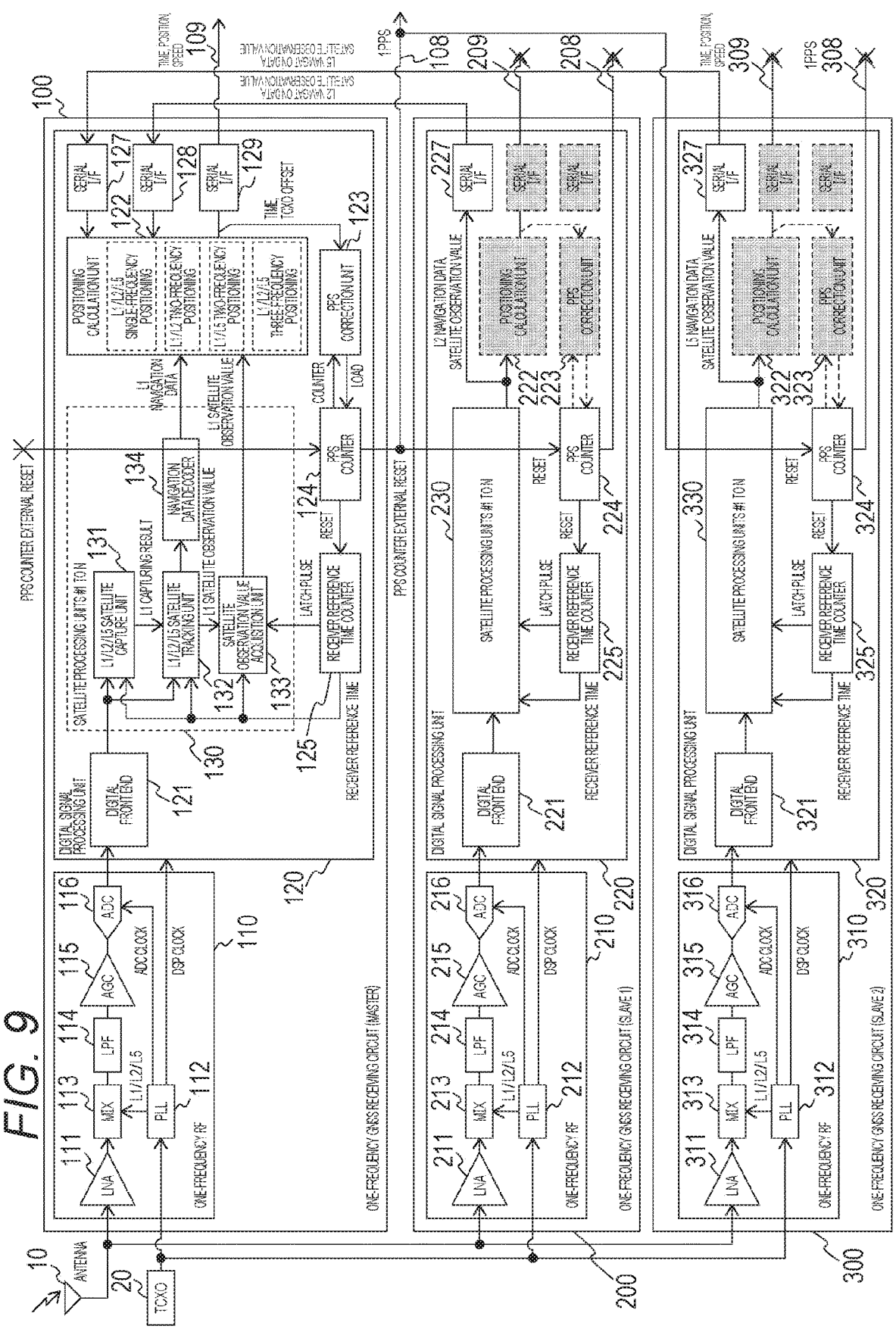
FIG. 9 is a diagram illustrating a configuration example of a satellite positioning signal receiving device according to an eighth embodiment of the present technology.

FIG. 9 is a diagram illustrating a configuration example of a satellite positioning signal receiving device according to an eighth embodiment of the present technology.

The eighth embodiment differs from the above-described first embodiment in that, in order to support three frequencies, another GNSS receiving circuit 300 that supports one frequency is added as a second slave. Then, the eighth embodiment also differs in that another serial interface 127 is added to a GNSS receiving circuit 100 so that data from the GNSS receiving circuit 300 can also be received.

As an example of assignment of the three frequencies, an example is illustrated in which L1 is assigned to the GNSS receiving circuit 100 (master), L2 is assigned to a GNSS receiving circuit 200 (first slave), and L5 is assigned to the GNSS receiving circuit 300 (second slave).

The GNSS receiving circuit 100 can also synchronize with the GNSS receiving circuit 300 by connecting a 1 PPS to the GNSS receiving circuit 300 as an external reset. Furthermore, the GNSS receiving circuit 100 uses L1 navigation data and satellite observation values acquired by itself, L2 navigation data and satellite observation values transmitted from the GNSS receiving circuit 200, and L5 navigational data and satellite observation values transmitted from the GNSS receiving circuit 300. This allows a positioning calculation unit 122 to also perform a positioning calculation using the three frequencies, L1, L2, and L5.

By supporting three frequencies, the effect of frequency diversity can be further enhanced as compared with supporting two frequencies, and resistance to interference can be improved and more stable positioning performance can be achieved. Furthermore, in a case of application to RTK or PPP, the initialization time can be further shortened as compared with supporting two frequencies.

9. Ninth Embodiment

Figure 10:
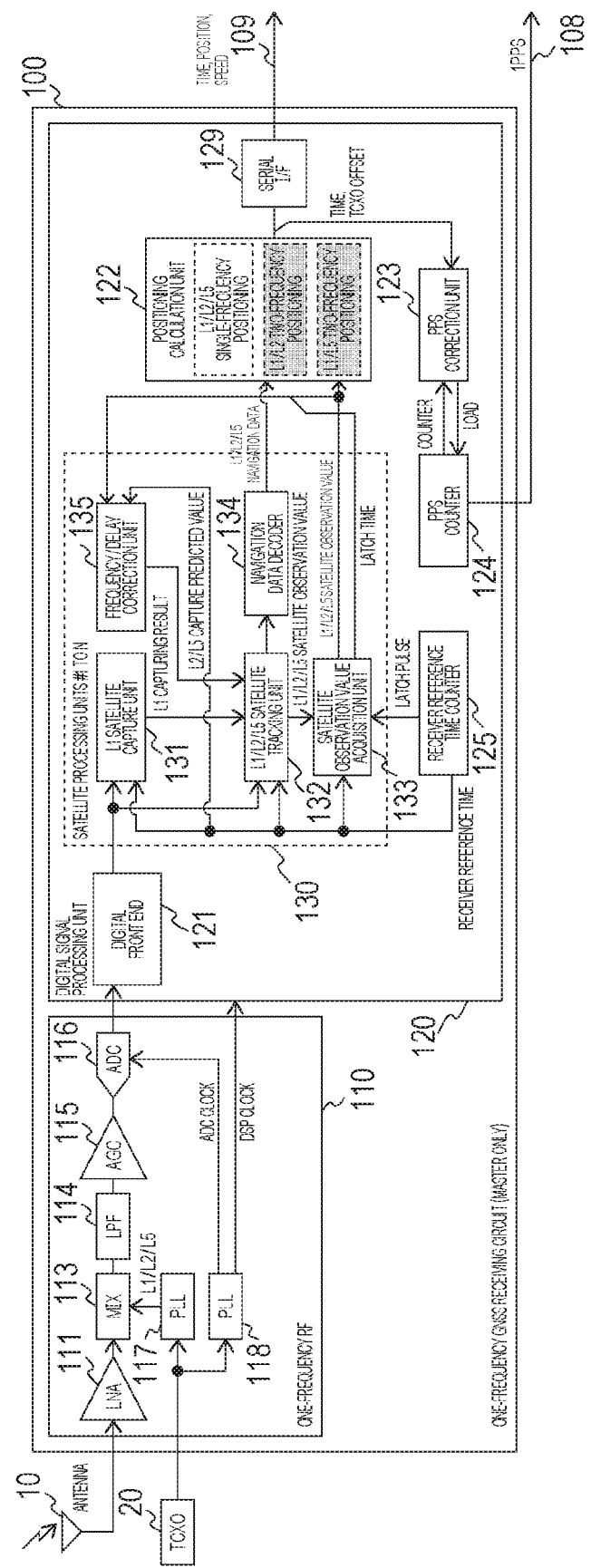
FIG. 10 is a diagram illustrating a configuration example of a satellite positioning signal receiving device according to a ninth embodiment of the present technology.

FIG. 10 is a diagram illustrating a configuration example of a satellite positioning signal receiving device according to a ninth embodiment of the present technology.

As compared with the above-described first embodiment, in the ninth embodiment, there is only one GNSS receiving circuit (only a GNSS receiving circuit 100), which is a master, and a master/slave interface is omitted. Then, since master/slave synchronization is not required, there is no reset signal from a PPS counter 124 to a receiver reference time counter 125. Furthermore, in an RF circuit 110, a PLL 118 for generating an ADC clock and a DSP clock is disposed independently of a PLL 117 for generating a local oscillation signal in the L1, L2, or L5 band.

In such a configuration, the satellite positioning signal receiving device of the ninth embodiment performs capture and tracking while sequentially switching between an L1 satellite and an L2 or L5 satellite.

In the RF circuit 110, the PLLs 117 and 118 are disposed independently for generation of a local oscillation signal and generation of a clock, respectively. This allows synchronization with a digital clock to be continuously maintained, independently of switching of the local oscillation frequency. Note that the PLL 117 is an example of a first phase locked loop described in the claims. Furthermore, the PLL 118 is an example of a second phase locked loop described in the claims.

A digital signal processing unit 120 first captures and tracks the L1 satellite, and the satellite observation value and the latch time are used to generate a predicted value of L2 or L5 capture. Next, after switching the local oscillation frequency of the RF circuit 110 to L2 or L5, L2 or L5 satellite tracking is started using the predicted value generated earlier.

In this way, according to the ninth embodiment of the present technology, it is not possible to support two-frequency simultaneous observation or two-frequency positioning, but it is possible to support single-frequency positioning for any one of L1, L2, or L5 with a minimum circuit cost, without adding a satellite capture circuit or a satellite processing unit for L2 or L5. That is, the interference resistance can be improved, and the position accuracy, the multipath resistance, and the sensitivity can be improved by using modernized GNSS signals.

[Summary]

As described above, in the embodiments of the present technology, one or more GNSS receiving circuits supporting only one frequency are included, and a synchronization control interface that synchronizes the receiving circuits and a transmission interface for sharing satellite observation information between the receiving circuits are provided. This enables one frequency positioning or multi-frequency positioning for two or more frequencies. The number of GNSS receiving circuits can be gradually increased in accordance with the required number of frequency bands to optimize the circuit cost and power consumption for each application.

Note that the above-described embodiments show examples for embodying the present technology, and the matters in the embodiments correspond to the matters specifying the invention in the claims. Similarly, the matters specifying the invention in the claims correspond to the matters in the embodiments of the present technology having the same names. However, the present technology is not limited to the embodiments, and can be embodied by making a wide variety of modifications to the embodiments without departing from the gist thereof.

Note that the effects described herein are merely illustrative and are not intended to be restrictive, and other effects may be obtained.

Note that the present technology can also be configured as described below.

(1) A satellite positioning signal receiving device including at least one satellite positioning signal receiving circuit that supports a single frequency band, receives a satellite positioning signal, and generates satellite observation information,
    in which each of the satellite positioning signal receiving circuits includes a synchronization control interface that synchronizes the satellite positioning signal receiving circuits with each other, and a satellite information transmission interface that shares the satellite observation information between the satellite positioning signal receiving circuits, and
    positioning is performed on the basis of the satellite observation information.

(2) The satellite positioning signal receiving device according to (1), in which
    the synchronization control interface includes an output signal that is a rectangular pulse signal having a one-second cycle, and an external reset input signal that resets a pulse counter that generates the rectangular pulse signal, and
    each of the satellite positioning signal receiving circuits resets the pulse counter on the basis of the external reset input signal, and resets a reference time counter that counts a reference time of the satellite positioning signal receiving circuit on the basis of a count time of the pulse counter.

(3) The satellite positioning signal receiving device according to (1), in which
    the synchronization control interface includes a reset output signal of a reference time counter that counts a reference time of the satellite positioning signal receiving circuit, and an external reset input signal for the reference time counter, and each of the satellite positioning signal receiving circuits resets the reference time counter on the basis of the external reset input signal, and outputs the reset output signal on the basis of a count time of the reference time counter.

(4) The satellite positioning signal receiving device according to (1), in which
each of the satellite positioning signal receiving circuits resets a reference time counter that counts a reference time of the satellite positioning signal receiving circuit on the basis of a count time of a pulse counter that generates a rectangular pulse signal having a one-second cycle to achieve, in place of the synchronization control interface, synchronization with a time accuracy of the rectangular pulse signal.

(5) The satellite positioning signal receiving device according to any one of (1) to (4), in which
the satellite information transmission interface is a wired interface.

(6) The satellite positioning signal receiving device according to (5), in which
the satellite information transmission interface is a wired serial interface.

(7) The satellite positioning signal receiving device according to any one of (1) to (4), in which
the satellite information transmission interface is a wireless interface.

(8) The satellite positioning signal receiving device according to (1), in which
among the satellite positioning signal receiving circuits, a satellite positioning signal receiving circuit that receives a frequency band other than a first frequency band performs satellite capture using satellite observation information obtained from a satellite positioning signal receiving circuit that receives the first frequency band.

(9) The satellite positioning signal receiving device according to (1), in which
each of the satellite positioning signal receiving circuits includes an antenna independently of each other.

(10) A satellite positioning signal receiving device including first and second satellite positioning signal receiving circuits,
in which each of the first and second satellite positioning signal receiving circuits includes a radio frequency processing unit that supports a single frequency band and converts a radio frequency signal to a digital signal, a reference time counter that counts a reference time, and a digital signal processing unit that performs satellite capture and satellite tracking on the basis of the digital signal in accordance with the reference time,
the reference time counters of the first and second satellite positioning signal receiving circuits count the reference time in synchronization with each other,
the second satellite positioning signal receiving circuit acquires satellite observation information in a second frequency band different from the first satellite positioning signal receiving circuit, and supplies the acquired satellite observation information to the first satellite positioning signal receiving circuit, and
the first satellite positioning signal receiving circuit acquires satellite observation information in a first frequency band different from the second satellite positioning signal receiving circuit, and performs positioning using satellite observation information in a plurality of frequency bands including the satellite observation information in the second frequency band supplied from the second satellite positioning signal receiving circuit.

(11) The satellite positioning signal receiving device according to (10), in which
the digital signal processing unit of the second satellite positioning signal receiving circuit has a circuit configuration supporting only the second frequency band.

(12) The satellite positioning signal receiving device according to (10), in which
each of the first and second satellite positioning signal receiving circuits further includes a pulse counter that outputs a rectangular pulse signal having a one-second cycle to the outside,
the pulse counter of the second satellite positioning signal receiving circuit is reset by the pulse counter of the first satellite positioning signal receiving circuit, and
each of the first and second satellite positioning signal receiving circuits resets the reference time counter in accordance with the pulse counter to cause the reference time counters of the first and second satellite positioning signal receiving circuits to synchronize with each other.

(13) The satellite positioning signal receiving device according to (10), in which
the reference time counter of the first satellite positioning signal receiving circuit outputs a reference time reset signal that resets the reference time, and
the reference time counters of the first and second satellite positioning signal receiving circuits reset the reference time counters in accordance with the reference time reset signal to cause the reference time counters of the first and second satellite positioning signal receiving circuits to synchronize with each other.

(14) The satellite positioning signal receiving device according to (10), in which
each of the first and second satellite positioning signal receiving circuits further includes a pulse counter that outputs a rectangular pulse signal having a one-second cycle to the outside,
the digital signal processing unit of the second satellite positioning signal receiving circuit performs positioning using satellite observation information in the second frequency band,
the pulse counter of the second satellite positioning signal receiving circuit is corrected on the basis of a result of the positioning using the satellite observation information in the second frequency band, and
each of the first and second satellite positioning signal receiving circuits resets the reference time counter in accordance with the pulse counter to cause the reference time counters of the first and second satellite positioning signal receiving circuits to synchronize with each other.

(15) The satellite positioning signal receiving device according to any one of (10) to (14), in which
each of the first and second satellite positioning signal receiving circuits includes a wireless interface through which satellite observation information in the second frequency band is supplied from the second satellite positioning signal receiving circuit to the first satellite positioning signal receiving circuit.

(16) The satellite positioning signal receiving device according to (10), in which the first satellite positioning signal receiving circuit supplies satellite observation information in the first frequency band to the second satellite positioning signal receiving circuit, and the second satellite positioning signal receiving circuit includes a satellite observation value correction unit that corrects the satellite observation information in the first frequency band supplied from the first satellite positioning signal receiving circuit, and performs, on the basis of a result of this correction, satellite tracking in the second frequency band.

(17) The satellite positioning signal receiving device according to (10), in which
each of the first and second satellite positioning signal receiving circuits includes an antenna through which a radio frequency signal is supplied to the radio frequency processing unit.

(18) The satellite positioning signal receiving device according to (10), further including
a third satellite positioning signal receiving circuit that includes the radio frequency processing unit, the reference time counter, and the digital signal processing unit,
in which the reference time counters of the first and third satellite positioning signal receiving circuits count the reference time in synchronization with each other,
the third satellite positioning signal receiving circuit acquires satellite observation information in a third frequency band different from the first satellite positioning signal receiving circuit, and supplies the acquired satellite observation information to the first satellite positioning signal receiving circuit, and
the first satellite positioning signal receiving circuit performs positioning using satellite observation information in a plurality of frequency bands including the satellite observation information in the third frequency band supplied from the third satellite positioning signal receiving circuit.

(19) A satellite positioning signal receiving device including:
a radio frequency processing unit that supports a single frequency band and converts a radio frequency signal to a digital signal;
a digital signal processing unit that performs satellite capture and satellite tracking on the basis of the digital signal in accordance with a reference time;
a first phase locked loop that sequentially supplies local oscillator signals in different frequency bands to the radio frequency processing unit; and
a second phase locked loop that is independent of the first phase locked loop and supplies a clock signal to an analog-to-digital converter of the radio frequency processing unit and the digital signal processing unit.

REFERENCE SIGNS LIST 10 to 12, 31, 32 Antenna
100, 200, 300 GNSS receiving circuit
108, 208, 308 1 PPS output
110, 210, 310 Radio frequency circuit (RF circuit)
111, 211, 311 Low noise amplifier (LNA)
112, 117, 118, 212, 312 Phase locked loop (PLL)
113, 213, 313 Mixer circuit (MIX)
114, 214, 314 Low pass filter (LPF)
115, 215, 315 Auto gain control (AGC)
116, 216, 316 Analog-to-digital converter (ADC)
120, 220, 320 Digital signal processing unit
121, 221, 321 Digital front end
122, 222, 322 Positioning calculation unit
123, 223, 323 PPS correction unit
124, 224, 324 PPS counter
125, 225, 325 Receiver reference time counter
126, 226 Wireless interface
127 to 129, 227 to 229, 327 Serial interface
130, 230, 330 Satellite processing unit
131, 231 Satellite capture unit
132, 232 Satellite tracking unit
133, 233 Satellite observation value acquisition unit
134, 234 Navigation data decoder
135, 235 Frequency/delay correction unit
612 Multiplier
613 Correlator
621 Timing error detector
622 Code synchronization loop filter
623 Code synchronization NCO
624 Code generator
632 Carrier synchronization loop filter
633 Carrier synchronization NCO
641 Bit synchronization unit
642 Preamble synchronization unit
650 Satellite time counter
660 Pseudorange calculation unit

The invention claimed is:

1. A satellite positioning signal receiving device, comprising:
at least two satellite positioning signal receiving circuits, wherein
each of the at least two satellite positioning signal receiving circuits is configured to:
support a single frequency band;
receive a satellite positioning signal; and
generate satellite observation information,
each of the at least two satellite positioning signal receiving circuits comprises:
a synchronization control interface configured to synchronize each of the at least two satellite positioning signal receiving circuits with each other;
a satellite information transmission interface configured to share the satellite observation information between the at least two satellite positioning signal receiving circuits; and
a positioning calculation unit configured to perform positioning calculation based on the satellite observation information,
the synchronization control interface comprises:
a reset output signal of a reference time counter that is configured to count a reference time of a corresponding satellite positioning signal receiving circuit of the at least two satellite positioning signal receiving circuits, and
an external reset input signal for the reference time counter,
each of the at least two satellite positioning signal receiving circuits is configured to:
reset the reference time counter based on the external reset input signal; and
output the reset output signal based on a count time of the reference time counter, wherein the reset output signal of a first satellite positioning signal receiving circuit is configured to reset a second satellite positioning signal receiving circuit, and
the first satellite positioning signal receiving circuit and the second satellite positioning signal receiving circuit are included in the at least two satellite positioning signal receiving circuits.

2. The satellite positioning signal receiving device according to claim 1, wherein
the reset output signal that is a rectangular pulse signal having a one-second cycle,
the external reset input signal resets a pulse counter that is configured to generate the rectangular pulse signal, and
each of the at least two satellite positioning signal receiving circuits is configured to reset the pulse counter based on the external reset input signal, and reset the reference time counter that is configured to count the reference time of the satellite positioning signal receiving circuit based on a count time of the pulse counter.

3. The satellite positioning signal receiving device according to claim 1, wherein
each of the at least two satellite positioning signal receiving circuits is configured to reset the reference time counter based on a count time of a pulse counter that is configured to generate a rectangular pulse signal having a one-second cycle to achieve, in place of the synchronization control interface, synchronization with a time accuracy of the rectangular pulse signal.

4. The satellite positioning signal receiving device according to claim 1, wherein
the satellite information transmission interface is a wired interface.

5. The satellite positioning signal receiving device according to claim 4, wherein
the satellite information transmission interface is a wired serial interface.

6. The satellite positioning signal receiving device according to claim 1, wherein
the satellite information transmission interface is a wireless interface.

7. The satellite positioning signal receiving device according to claim 1, wherein
among the at least two satellite positioning signal receiving circuits, a satellite positioning signal receiving circuit of the at least two satellite positioning signal receiving circuits that is configured to receive a frequency band other than a first frequency band is further configured to perform satellite capture using satellite observation information obtained from a satellite positioning signal receiving circuit of the at least two satellite positioning signal receiving circuit that is configured to receive the first frequency band.

8. The satellite positioning signal receiving device according to claim 1, wherein
each of the at least two satellite positioning signal receiving circuits comprises an antenna.

9. A satellite positioning signal receiving device, comprising:
first and second satellite positioning signal receiving circuits, wherein
each of the first and second satellite positioning signal receiving circuits comprises:
a radio frequency processing unit configured to support a single frequency band and convert a radio frequency signal to a digital signal;
a reference time counter configured to count a reference time; and
a digital signal processing unit configured to perform satellite capture and satellite tracking based on the digital signal in accordance with the reference time,
each of the reference time counters of the first and second satellite positioning signal receiving circuits is configured to count the reference time in synchronization with each other,
the second satellite positioning signal receiving circuit is configured to:
acquire satellite observation information in a second frequency band different from a first frequency band associated with the first satellite positioning signal receiving circuit; and
supply the acquired satellite observation information to the first satellite positioning signal receiving circuit,
the first satellite positioning signal receiving circuit is configured to:
acquire satellite observation information in the first frequency band different from the second frequency band associated with the second satellite positioning signal receiving circuit; and
perform positioning using satellite observation information in a plurality of frequency bands including the satellite observation information in the second frequency band supplied from the second satellite positioning signal receiving circuit, and
each of the first and second satellite positioning signal receiving circuits is configured to:
reset the reference time counter based on an external reset input signal for the reference time counter; and
output a reset output signal based on a count time of the reference time counter, wherein the reset output signal of the first satellite positioning signal receiving circuit is configured to reset the second satellite positioning signal receiving circuit.

10. The satellite positioning signal receiving device according to claim 9, wherein
the digital signal processing unit of the second satellite positioning signal receiving circuit has a circuit configuration supporting only the second frequency band.

11. The satellite positioning signal receiving device according to claim 9, wherein
each of the first and second satellite positioning signal receiving circuits further comprises a pulse counter that is configured to output a rectangular pulse signal having a one-second cycle to outside,
the pulse counter of the second satellite positioning signal receiving circuit is reset by the pulse counter of the first satellite positioning signal receiving circuit, and
each of the first and second satellite positioning signal receiving circuits is configured to reset the reference time counter based on the pulse counter to cause the reference time counters of the first and second satellite positioning signal receiving circuits to synchronize with each other.

12. The satellite positioning signal receiving device according to claim 9, wherein
the reference time counter of the first satellite positioning signal receiving circuit is configured to output a reference time reset signal that is further configured to reset the reference time, and
each of the reference time counters of the first and second satellite positioning signal receiving circuits is configured to reset the reference time counters based on the reference time reset signal to cause the reference time counters of the first and second satellite positioning signal receiving circuits to synchronize with each other.

13. The satellite positioning signal receiving device according to claim 9, wherein
- each of the first and second satellite positioning signal receiving circuits further comprises a pulse counter that is configured to output a rectangular pulse signal having a one-second cycle to outside,
- the digital signal processing unit of the second satellite positioning signal receiving circuit is configured to perform positioning using the satellite observation information in the second frequency band,
- the pulse counter of the second satellite positioning signal receiving circuit is corrected based on a result of the positioning using the satellite observation information in the second frequency band, and
- each of the first and second satellite positioning signal receiving circuits is configured to reset the reference time counter based on the pulse counter to cause the reference time counters of the first and second satellite positioning signal receiving circuits to synchronize with each other.

14. The satellite positioning signal receiving device according to claim 9, wherein
- each of the first and second satellite positioning signal receiving circuits comprises a wireless interface through which the satellite observation information in the second frequency band is supplied from the second satellite positioning signal receiving circuit to the first satellite positioning signal receiving circuit.

15. The satellite positioning signal receiving device according to claim 9, wherein
- the first satellite positioning signal receiving circuit is configured to supply the satellite observation information in the first frequency band to the second satellite positioning signal receiving circuit, and
- the second satellite positioning signal receiving circuit comprises a satellite observation value correction unit that is configured to:
  - correct the satellite observation information in the first frequency band supplied from the first satellite positioning signal receiving circuit; and
  - perform, based on a result of the correction, satellite tracking in the second frequency band.

16. The satellite positioning signal receiving device according to claim 8, wherein
- each of the first and second satellite positioning signal receiving circuits comprises an antenna through which the radio frequency signal is supplied to the radio frequency processing unit.

17. The satellite positioning signal receiving device according to claim 9, further comprising
- a third satellite positioning signal receiving circuit that comprises the radio frequency processing unit, the reference time counter, and the digital signal processing unit,
- wherein the reference time counters of the first and third satellite positioning signal receiving circuits count the reference time in synchronization with each other,
- the third satellite positioning signal receiving circuit is configured to acquire satellite observation information in a third frequency band different from the first satellite positioning signal receiving circuit, and supply the acquired satellite observation information to the first satellite positioning signal receiving circuit, and
- the first satellite positioning signal receiving circuit is configured to perform positioning using satellite observation information in a plurality of frequency bands including the satellite observation information in the third frequency band supplied from the third satellite positioning signal receiving circuit.

18. A satellite positioning signal receiving device, comprising:
- a radio frequency processing unit configured to support a single frequency band and convert a radio frequency signal to a digital signal;
- a digital signal processing unit configured to perform satellite capture and satellite tracking based on the digital signal in accordance with a reference time;
- a first phase locked loop configured to sequentially supply local oscillator signals in different frequency bands to the radio frequency processing unit;
- a second phase locked loop independent of the first phase locked loop, wherein the second phase locked loop is configured to supply a clock signal to an analog-to-digital converter of the radio frequency processing unit and the digital signal processing unit; and
- a reference time counter configured to count a reference time, wherein the reference time counter is reset based on an external reset input signal for the reference time counter, and a reset output signal is outputted based on a count time of the reference time counter.

* * * * *